US012485441B2

(12) United States Patent
Liang

(10) Patent No.: US 12,485,441 B2
(45) Date of Patent: Dec. 2, 2025

(54) SINGLE MATERIAL ALL PLASTIC LOTION PUMP AND STORAGE BOTTLE OF APPLICATION THEREOF

(71) Applicant: Guangzhou Shanggong Plastic Co., Ltd, Guangzhou (CN)

(72) Inventor: Qi Quan Liang, Guangzhou (CN)

(73) Assignee: Guangzhou Shanggong Plastic Co., Ltd, Guangzhou (CN)

( * ) Notice: Subject to any disclaimer, the term of this patent is extended or adjusted under 35 U.S.C. 154(b) by 0 days.

(21) Appl. No.: 17/924,367

(22) PCT Filed: Sep. 26, 2022

(86) PCT No.: PCT/CN2022/121401

§ 371 (c)(1),
(2) Date: Nov. 10, 2022

(87) PCT Pub. No.: WO2024/011755

PCT Pub. Date: Jan. 18, 2024

(65) Prior Publication Data

US 2024/0216937 A1 Jul. 4, 2024

(30) Foreign Application Priority Data

Jul. 14, 2022 (CN) ......................... 202210834632.2

(51) Int. Cl.
*B05B 11/10* (2023.01)

(52) U.S. Cl.
CPC ...... *B05B 11/1001* (2023.01); *B05B 11/1043* (2023.01); *B05B 11/1077* (2023.01)

(58) Field of Classification Search
CPC ............. B05C 11/1001; B05C 11/1043; B05C 11/1077
See application file for complete search history.

(56) References Cited

U.S. PATENT DOCUMENTS 8,657,160 B2 * 2/2014 Lashells .............. B05B 11/1008
222/153.04
11,772,114 B2 * 10/2023 Zhu ....................... B05B 11/105
222/320

FOREIGN PATENT DOCUMENTS

CN 112173408 A * 1/2021 ......... B05B 11/1001
CN 113120420 A * 7/2021 ......... B05B 11/1001

OTHER PUBLICATIONS

Machine translation of CN-112173408-A.*
Machine translation of CN-113120420-A.*

* cited by examiner

*Primary Examiner* — Jeremy Carroll
(74) *Attorney, Agent, or Firm* — Hawaii Patent Services; Nathaniel K. Fedde; Kenton N. Fedde

(57) ABSTRACT

The disclosure provides a single material all plastic lotion pump and a storage bottle of application thereof, and the pump includes a plastic pump casing, a plastic pressing head, a plastic cylinder casing and a plastic double piston mechanism; the plastic pump casing is provided with a material delivery tube that communicates between the inside and outside; and the overall material of the disclosure is plastic, soft rubber, etc., there is no need for disassembly operation in case of recycling, and the full plastic lotion pump can be directly recycled, which greatly improves the recycling efficiency, greatly reduces the recycling cost, and effectively solves the problem of difficult recycling of the existing lotion pump head.

9 Claims, 6 Drawing Sheets

SINGLE MATERIAL ALL PLASTIC LOTION PUMP AND STORAGE BOTTLE OF APPLICATION THEREOF

TECHNICAL FIELD

The disclosure relates to the technical field of lotion pump, in particular to a single material all plastic lotion pump and a storage bottle of application thereof.

BACKGROUND

In the existing lotion pump heads, the materials used for each component are different, some are plastic components, some are metal components, for example, the reset spring is made of metal, which will lead to a huge recycling cost of the pump head; and because plastic components and metal components need to be classified and recycled during the pump head recycling, the pump head must be disassembled manually to recycle the metal spring separately, which is time-consuming and laborious, and seriously restricts the classification and recycling of the pump head.

SUMMARY

The objective of the disclosure is to provide a single material all plastic lotion pump and a storage bottle of application thereof, so as to solve the problem of difficult recycling of the existing lotion pump head.

In order to solve the above technical problems, the disclosure provides a single material all plastic lotion pump, which includes a plastic pump casing, a plastic pressing head, a plastic cylinder casing and a plastic double piston mechanism; the plastic pump casing is provided with a material delivery tube, and the material delivery tube communicates between the inside and outside of the plastic pump casing; the plastic pressing head is connected with the material delivery tube in an inserting and compressible manner, the plastic pressing head is provided with a discharge hole, and the discharge hole is connected with the material delivery tube for communication; the plastic cylinder casing is of a structure opening at both ends, one port of the plastic cylinder casing is placed in the plastic pump casing and surrounds the mouth of the material delivery tube, and the other port of the plastic cylinder casing is connected with a material guide hose for communication; and the plastic double piston mechanism is arranged in the plastic cylinder casing in a manner that can carry out piston movement, the discharge end of the plastic double piston mechanism is connected with the discharge hole for communication, the feed end of the plastic double piston mechanism is of a structure for controlling the opening and closing through the plastic pressing head by pressing, and the feed end opened by the plastic double piston mechanism communicates with the material guide hose.

In one embodiment, the plastic double piston mechanism includes a first plastic piston, a second plastic piston, a plastic reset spring and a plastic material guide tube; the first plastic piston is arranged adjacent to the material delivery tube; the second plastic piston is arranged adjacent to the material guide hose; the plastic reset spring is arranged between the first plastic piston and the second plastic piston, and the plastic reset spring is used to drive the first plastic piston to reset; the discharge end of the plastic material guide tube is connected with the discharge hole for communication, and the plastic material guide tube is connected into the material delivery tube in an inserting and movable manner; the plastic material guide tube is fixedly connected with the first plastic piston in an interpenetrating manner; and the plastic material guide tube is movably connected with the second plastic piston in an interpenetrating manner, and their moveable connection is used to control the communication and blockage of the plastic double piston mechanism and the material guide hose.

In one embodiment, the first plastic piston is provided with a piston hole, which penetrates through the first plastic piston; a positioning tube is arranged on the surface of the second plastic piston toward the first plastic piston, and the positioning tube penetrates through the second plastic piston; the plastic material guide tube includes a fixed tube section and a movable tube section; one end of the fixed tube section is connected with the discharge hole for communication, and the other end of the fixed tube section passes through the piston hole and is movably connected with the positioning tube in a sleeving manner; the movable tube section is movably interpenetrated into the positioning tube, one end of the movable tube section is fixedly sleeved in the fixed tube section, the other end of the movable tube section is closed to form a stop block, the stop block seals and blocks the port of the positioning tube, the peripheral wall of the movable tube section adjacent to the stop block is provided with a material guide hole, and the material guide hole communicates between the inside and outside of the movable tube section; and the pressing of the plastic pressing head is used to control the material guide hole to move out of the space shielded by the positioning tube.

In one embodiment, the plastic reset spring is tubular.

In one embodiment, the inner wall of the plastic cylinder casing is provided with a circle of bearing steps, and the plastic reset spring is compressed on the first plastic piston and the bearing steps.

In one embodiment, the casing wall of the plastic cylinder casing is provided with an air return hole, the air return hole communicates between the inside and outside of the plastic cylinder casing, and the air return hole is arranged on the side of the plastic cylinder casing adjacent to the material delivery tube; and the plastic double piston mechanism at the initial position covers the air return hole.

In one embodiment, the plastic cylinder casing is provided a one-way valve inside, and the one-way valve includes a rubber ring, an elastic rubber film and a soft rubber connecting rib; the rubber ring is provided with the elastic rubber film inside; the elastic rubber film shields the position of the connection and communication part of the material guide hose and the plastic cylinder casing; and a plurality of the soft rubber connecting ribs are connected between the inner peripheral wall of the rubber ring and the outer peripheral edge of the elastic rubber film.

In one embodiment, the plastic cylinder casing is sleeved with a gasket.

In one embodiment, the all plastic lotion pump further includes a half ring buckle, the half ring buckle is detachably buckled at the connection position of the plastic pump casing and the plastic pressing head, and the half ring buckle is blocked on the pressing track of the plastic pressing head.

In order to solve the above technical problems, the disclosure provides a single material storage bottle, the storage bottle is equipped with the above-mentioned all plastic lotion pump, and the material guide hose is placed in the storage bottle.

The beneficial effects of the disclosure are as follows:

Because the disclosure is a single material all plastic lotion pump, which includes a plastic pump casing, a plastic pressing head, a plastic cylinder casing and a plastic double piston mechanism, the overall material is plastic, soft rubber, etc., there is no need for disassembly operation in case of recycling, and the full plastic lotion pump can be directly recycled, which greatly improves the recycling efficiency, greatly reduces the recycling cost, and effectively solves the problem of difficult recycling of the existing lotion pump head.

BRIEF DESCRIPTION OF FIGURES

In order to more clearly explain the technical solution of the disclosure, the following will briefly introduce the drawings needed in the implementations. Obviously, the drawings in the following description are only some implementations of the disclosure. For those of ordinary skills in the art, they can also obtain other drawings based on these drawings without paying creative labor.

The drawings are marked as follows.

Figure 1:
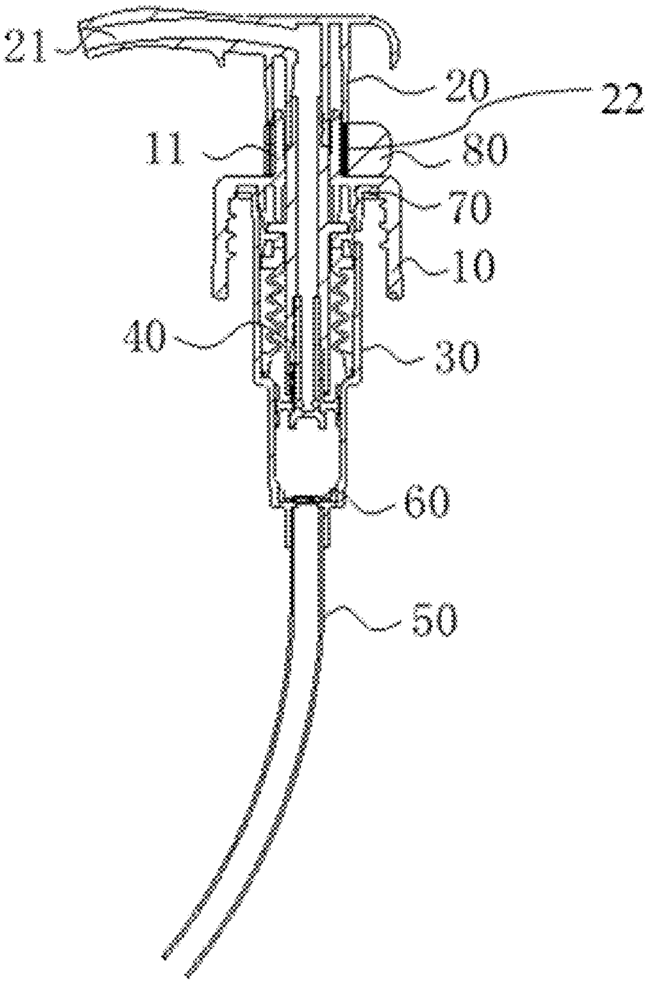
FIG. 1 is a schematic structural diagram of the all plastic lotion pump provided by the embodiment of the disclosure.

10. plastic pump casing; and 11. material delivery tube;

20. plastic pressing head; and 21. discharge hole; 22. pressing track;

30. plastic cylinder casing; 31. bearing steps; and 32. air return hole;

40. plastic double piston mechanism; 41. first plastic piston; 411. piston hole; 42. second plastic piston; 421. positioning tube; 43. plastic reset spring; 44. plastic material guide tube; 441. fixed tube section; 442. movable tube section; 443. stop block; and 444. material guide hole;

50. material guide hose;

60. one-way valve; 61. rubber ring; 62. elastic rubber film; and 63. soft rubber connecting rib;

70. gasket;

80. half ring buckle; and

90. storage bottle.

DETAILED DESCRIPTION

The technical solution in the implementations of the disclosure will be described clearly and completely in combination with the drawings in the implementations of the disclosure.

The disclosure provides a single material all plastic lotion pump, the embodiments are shown in FIG. 1 to FIG. 4, the single material all plastic lotion includes a plastic pump casing 10, a plastic pressing head 20, a plastic cylinder casing 30 and a plastic double piston mechanism 40; the plastic pump casing 10 is provided with a material delivery tube 11, and the material delivery tube 11 communicates between the inside and outside of the plastic pump casing 10; the plastic pressing head 20 is connected with the material delivery tube 11 in an inserting and compressible manner, the plastic pressing head 20 is provided with a discharge hole 21, and the discharge hole 21 is connected with the material delivery tube 11 for communication; the plastic cylinder casing 30 is of a structure opening at both ends, one port of the plastic cylinder casing 30 is placed in the plastic pump casing 10 and surrounds the mouth of the material delivery tube 11, and the other port of the plastic cylinder casing 30 is connected with a material guide hose 50 for communication; and the plastic double piston mechanism 40 is arranged in the plastic cylinder casing 30 in a manner that can carry out piston movement, the discharge end of the plastic double piston mechanism 40 is connected with the discharge hole 21 for communication, the feed end of the plastic double piston mechanism 40 is of a structure for controlling the opening and closing through the plastic pressing head 20 by pressing, and the feed end opened by the plastic double piston mechanism 40 communicates with the material guide hose 50.

When pressing is not carried out, the plastic double piston mechanism 40 is closed, so the communication between the discharge hole 21 and the material guide hose 50 will be cut off, thus the discharge cannot be realized; and after being pressed, the plastic pressing head 20 will move in the direction of the plastic pump casing 10 and control the plastic double piston mechanism 40 to open, so that the discharge hole 21 can communicate with the material guide hose 50 to realize the discharge operation.

In conclusion, because the disclosure is a single material all plastic lotion pump, which includes a plastic pump casing 10, a plastic pressing head 20, a plastic cylinder casing 30 and a plastic double piston mechanism 40, the overall material is plastic, soft rubber, etc., there is no need for disassembly operation in case of recycling, and the full plastic lotion pump can be directly recycled, which greatly improves the recycling efficiency, greatly reduces the recycling cost, and effectively solves the problem of difficult recycling of the existing lotion pump head.

As shown in FIG. 1 to FIG. 4, in this embodiment, the plastic double piston mechanism 40 preferentially includes a first plastic piston 41, a second plastic piston 42, a plastic reset spring 43 and a plastic material guide tube 44; the first plastic piston 41 is arranged adjacent to the material delivery tube 11; the second plastic piston 42 is arranged adjacent to the material guide hose 50; the plastic reset spring 43 is arranged between the first plastic piston 41 and the second plastic piston 42, and the plastic reset spring 43 is used to drive the first plastic piston 41 to reset; the discharge end of the plastic material guide tube 44 is connected with the discharge hole 21 for communication, and the plastic material guide tube 44 is connected into the material delivery tube 11 in an inserting and movable manner; the plastic material guide tube 44 is fixedly connected with the first plastic piston 41 in an interpenetrating manner; and the plastic material guide tube 44 is movably connected with the second plastic piston 42 in an interpenetrating manner, and their moveable connection is used to control the communication and blockage of the plastic double piston mechanism 40 and the material guide hose 50.

When the pressing operation is not carried out, the plastic reset spring 43 will push the first plastic piston 41 to the top of the plastic cylinder casing 30, which is the initial default position of the first plastic piston 41. Similarly, the plastic material guide tube 44 will drive the second plastic piston 42 to move up until the second plastic piston 42 reaches its initial default position; and in this state, the plastic material guide tube 44 is cut off, that is, the all plastic lotion pump cannot output.

After the pressing operation, the plastic material guide tube 44 will drive the first plastic piston 41 and the second plastic piston 42 to move down, and when the second plastic piston 42 moves down to the preset position, the plastic material guide tube 44 and the second plastic piston 42 will move relative to each other, so that the plastic material guide tube 44 will become a state of communication for material delivery, thus realizing the discharge operation of the all plastic lotion pump.

After the pressing operation is canceled, the plastic reset spring 43 will drive the first plastic piston 41 to reset. Under the corresponding linkage action, the second plastic piston 42 will also reset, and the plastic material guide tube 44 will become cut off through the relative movement of the plastic material guide tube 44 and the second plastic piston 42.

In order to realize the communication and blockage control of the plastic double piston mechanism 40, as shown in FIG. 1 to FIG. 4, in this embodiment, the first plastic piston 41 is preferentially provided with a piston hole 411, the piston hole 411 penetrates through the first plastic piston 41; a positioning tube 421 is arranged on the surface of the second plastic piston 42 toward the first plastic piston 41, and the positioning tube 421 penetrates through the second plastic piston 42; the plastic material guide tube 44 includes a fixed tube section 441 and a movable tube section 442; one end of the fixed tube section 441 is connected with the discharge hole 21 for communication, and the other end of the fixed tube section 441 passes through the piston hole 411 and is movably connected with the positioning tube 421 in a sleeving manner; the movable tube section 442 is movably interpenetrated into the positioning tube 421, one end of the movable tube section 442 is fixedly sleeved in the fixed tube section 441, the other end of the movable tube section 442 is closed to form a stop block 443, the stop block 443 seals and blocks the port of the positioning tube 421, the peripheral wall of the movable tube section 442 adjacent to the stop block 443 is provided with a material guide hole 444, and the material guide hole 444 communicates between the inside and outside of the movable tube section 442; and the pressing of the plastic pressing head 20 is used to control the material guide hole 444 to move out of the space shielded by the positioning tube 421.

Figure 3:
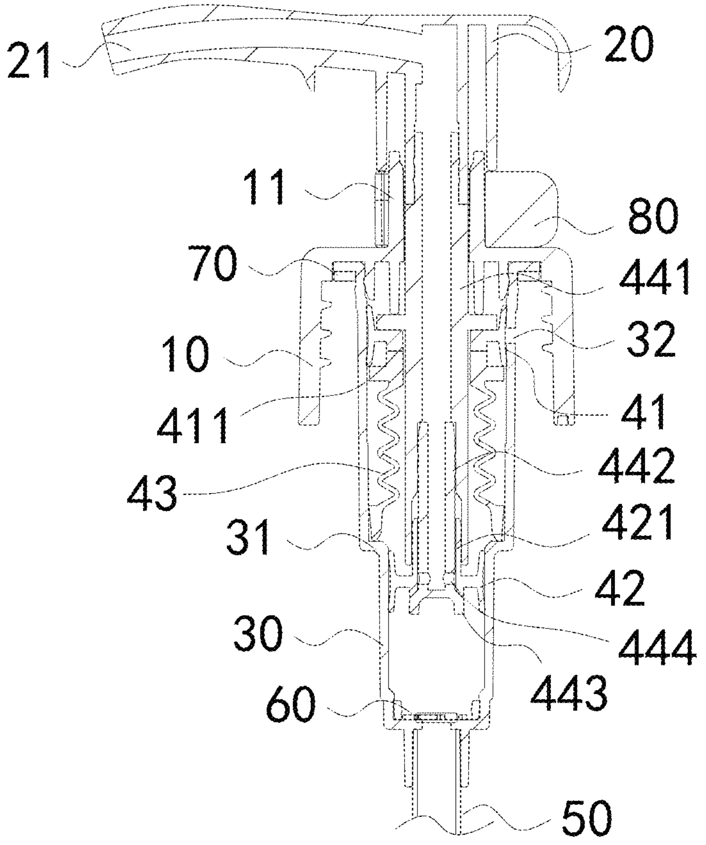
FIG. 3 is a schematic diagram of the partially enlarged structure of FIG. 1.

As shown in FIG. 3, the pressing operation is not carried out at this time, so the material guide hole 444 will be placed in the space enclosed by the positioning tube 421, making it impossible for the all plastic lotion pump to discharge; and as shown in FIG. 3, when the pressing operation is not carried out, the lower end surface of the movable tube section 442 is separated from the second plastic piston 42, so that the movable tube section 442 has a certain downward movement space when the pressing operation is carried out. Therefore, as shown in FIG. 4, after the pressing operation, the material guide hole 444 will move downward outside the space enclosed by the positioning tube 421, and then the lower end of the movable tube section 442 will be butted with the second plastic piston 42, thus, the second plastic piston 42 is pushed down, so as to output the material flow of the plastic piston cylinder casing through the material guide hole 444.

Figure 2:
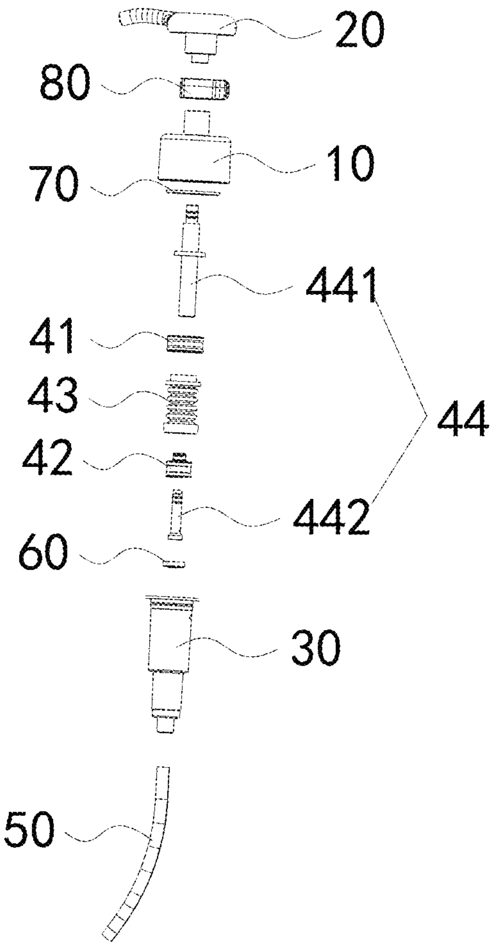
FIG. 2 is a schematic disassembly structure diagram of FIG. 1.
Figure 4:
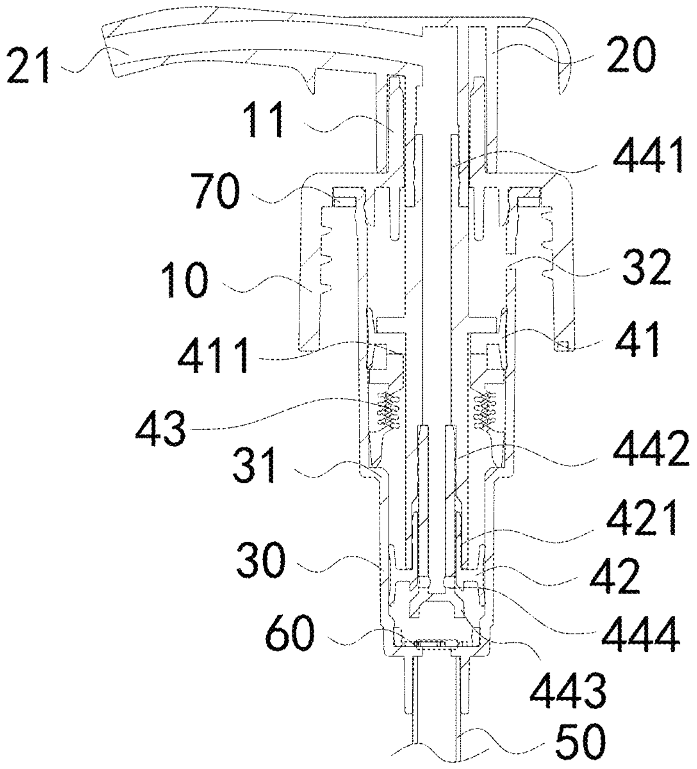
FIG. 4 is a schematic diagram of the pressing state structure of FIG. 3.

As shown in FIG. 2 to FIG. 4, in this embodiment, the plastic reset spring 43 is preferentially tubular.

After adopting this setting manner, the spring made of plastic can also have better deformation recovery ability, so that the metal spring can be completely replaced by the plastic reset spring 43.

As shown in FIG. 3 and FIG. 4, in this embodiment, the inner wall of the plastic cylinder casing 30 is preferentially provided with a circle of bearing steps 31, and the plastic reset spring 43 is compressed on the first plastic piston 41 and the bearing steps 31.

After adopting this setting manner, the installation and fixation of the plastic reset spring 43 are realized. After the plastic reset spring 43 is supported by the bearing step 31, it is ensured that the plastic reset spring 43 can stably drive the first plastic piston 41 and other related components to reset.

As shown in FIG. 1, FIG. 3 and FIG. 4, in this embodiment, the casing wall of the plastic cylinder casing 30 is preferentially provided with an air return hole 32, the air return hole 32 communicates between the inside and outside of the plastic cylinder casing 30, and the air return hole 32 is arranged on the side of the plastic cylinder casing 30 adjacent to the material delivery tube 11; and the plastic double piston mechanism 40 at the initial position covers the air return hole 32.

After adopting this setting manner, the air return hole 32 can be used to realize the pressure difference balance regulation in the plastic cylinder casing 30, so as to ensure that each component can automatically and quickly reset to the original position after the pressing operation.

Figure 5:
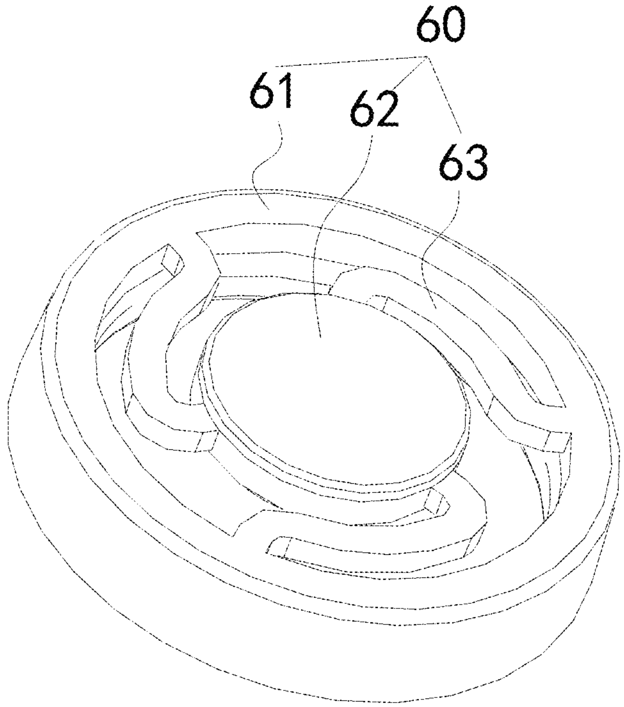
FIG. 5 is a schematic structural diagram of a one-way valve in FIG. 1.

As shown in FIG. 1 and FIG. 5, in this embodiment, the plastic cylinder casing 30 is preferentially provided a one-way valve 60 inside, and the one-way valve 60 comprises a rubber ring 61, an elastic rubber film 62 and a soft rubber connecting rib 63; the rubber ring 61 is provided with the elastic rubber film 62 inside; the elastic rubber film 62 shields the position of the connection and communication part of the material guide hose 50 and the plastic cylinder casing 30; and a plurality of the soft rubber connecting ribs 63 are connected between the inner peripheral wall of the rubber ring 61 and the outer peripheral edge of the elastic rubber film 62.

When there is no pressure difference change, the elastic rubber film 62 will completely shield the position of the connection and communication part of the material guide hose 50 and the plastic cylinder casing 30, so the materials will not enter the plastic cylinder casing 30; and after the pressure difference in the plastic cylinder casing 30 is changed due to the pressing operation, the elastic rubber film 62 will deform, thus removing the shielding of the position of the connection and communication of the material guide hose 50 and the plastic cylinder casing 30. Therefore, the materials can enter the plastic cylinder casing 30, so as to realize the one-way input of materials.

As shown in FIG. 1 and FIG. 4, in this embodiment, the plastic cylinder casing 30 is preferentially sleeved with a gasket 70.

After adopting this setting manner, the gasket 70 can be used to enhance the tightness of the all plastic lotion pump after assembly in the future.

As shown in FIG. 1, in this embodiment, the all plastic lotion pump preferentially further includes a half ring buckle 80, the half ring buckle 80 is detachably buckled at the connection position of the plastic pump casing 10 and the plastic pressing head 20, and the half ring buckle 80 is blocked on the pressing track 22 of the plastic pressing head 20. The half ring buckle 80 is placed between a top portion of the plastic pump casing 10 and an end portion of the plastic pressing head 20. As shown in FIG. 1, the half ring buckle 80 is specifically configured to rest over the top surface of the plastic pump casing 10 while also making contact with the end portion of the plastic pressing head 20. This positioning effectively prevents the movement of the plastic pressing head 20 by restricting its downward actuation. By doing so, the half ring buckle 80 serves as a locking or safety mechanism to avoid accidental operation. When the half ring buckle 80 is detached or removed from this position, it no longer obstructs the pressing track 22, thereby enabling the plastic pressing head 20 to move freely and perform its intended pressing function.

Therefore, when the half ring buckle 80 is buckled, the misoperation on the all plastic lotion pump can be avoided. Only after the half ring buckle 80 is removed, can the normal pressing and discharge operation be realized.

Figure 6:
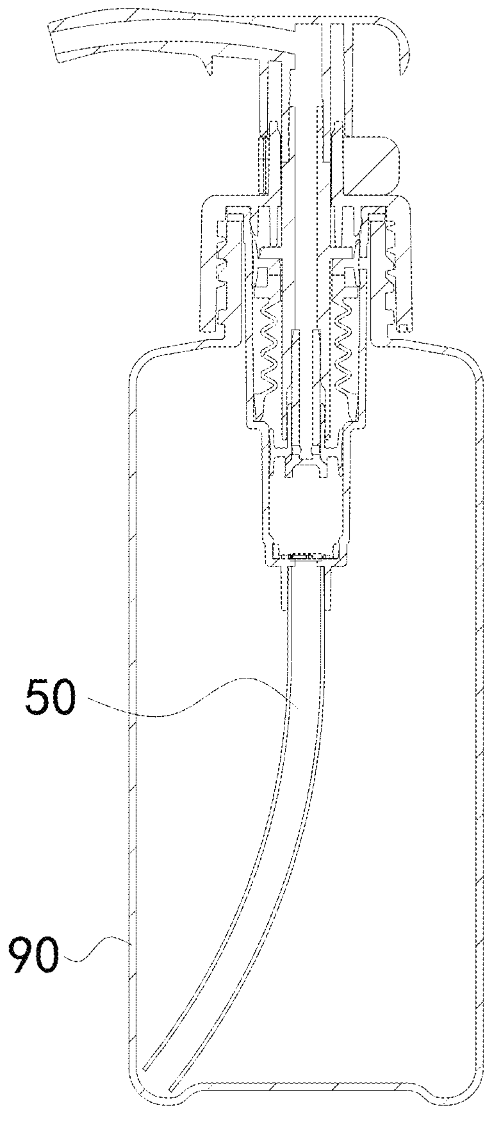
FIG. 6 is a schematic diagram of the application state structure of FIG. 1.

Of course, the above-mentioned all plastic lotion pump will be used in combination with the storage bottle in the actual application process, so the disclosure further provides a single material storage bottle, as shown in FIG. 6, the storage bottle 90 is equipped with the above-mentioned all plastic lotion pump, and the material guide hose 50 is placed in the storage bottle 90, which has the same functions as above, so it will not be described here.

The above is the preferred implementation of the disclosure. It should be pointed out that for those of ordinary skills in the art, certain improvements and embellishments can be made without departing from the principle of the disclosure. These improvements and embellishments are also considered as the protection scope of the disclosure.

What is claimed is:

1. A single material all plastic lotion pump, comprising:

a plastic pump casing comprising a top surface of the plastic pump casing, a plastic pressing head comprising an end portion of the plastic pressing head, a plastic cylinder casing, a half ring buckle, and a plastic double piston mechanism, wherein the plastic pump casing is provided with a material delivery tube, and the material delivery tube communicates between the inside and outside of the plastic pump casing;

the plastic pressing head is connected with the material delivery tube in an inserting and compressible manner, the plastic pressing head is provided with a discharge hole, and the discharge hole is connected with the material delivery tube for communication;

the plastic cylinder casing is of a structure opening at both ends, one port of the plastic cylinder casing is placed in the plastic pump casing and surrounds the mouth of the material delivery tube, and the other port of the plastic cylinder casing is connected with a material guide hose for communication;

the half ring buckle is detachably placed between the top surface of the plastic pump casing the end portion of the plastic pressing head to block the half ring buckle on a pressing track of the plastic pressing head, wherein the half ring buckle is configured to rest over the top surface of the plastic pump casing and in contact with the end portion of the plastic pressing head to prevent movement of the plastic pressing head, and detaching of the half ring buckle allows the movement of the plastic pressing head; and the plastic double piston mechanism is arranged in the plastic cylinder casing in a manner that can carry out piston movement, the discharge end of the plastic double piston mechanism is connected with the discharge hole for communication, the feed end of the plastic double piston mechanism is of a structure for controlling the opening and closing through the plastic pressing head by pressing, and the feed end opened by the plastic double piston mechanism communicates with the material guide hose, wherein, when the plastic pressing head is unpressed, the plastic double piston mechanism stays closed, so the discharge hole remains disconnected to the material guide hose and prevents lotion leakage, and when the plastic pressing head is pressed, the plastic pressing head moves toward the plastic pump casing and opens the plastic double piston mechanism, allowing the discharge hole to connect with the material guide hose to release the material.

2. The all plastic lotion pump according to claim 1, wherein the plastic double piston mechanism comprises a first plastic piston, a second plastic piston, a plastic reset spring and a plastic material guide tube;

the first plastic piston is arranged adjacent to the material delivery tube;

the second plastic piston is arranged adjacent to the material guide hose;

the plastic reset spring is arranged between the first plastic piston and the second plastic piston, and the plastic reset spring is used to drive the first plastic piston to reset; and the discharge end of the plastic material guide tube is connected with the discharge hole for communication, and the plastic material guide tube is connected into the material delivery tube in an inserting and movable manner; the plastic material guide tube is fixedly connected with the first plastic piston in an interpenetrating manner; and the plastic material guide tube is movably connected with the second plastic piston in an interpenetrating manner, and their moveable connection is used to control the communication and blockage of the plastic double piston mechanism and the material guide hose.

3. The all plastic lotion pump according to claim 2, wherein the first plastic piston is provided with a piston hole, which penetrates through the first plastic piston;

a positioning tube is arranged on the surface of the second plastic piston toward the first plastic piston, and the positioning tube penetrates through the second plastic piston;

the plastic material guide tube comprises a fixed tube section and a movable tube section;

one end of the fixed tube section is connected with the discharge hole for communication, and the other end of the fixed tube section passes through the piston hole and is movably connected with the positioning tube in a sleeving manner;

the movable tube section is movably interpenetrated into the positioning tube, one end of the movable tube section is fixedly sleeved in the fixed tube section, the other end of the movable tube section is closed to form a stop block, the stop block seals and blocks the port of the positioning tube, the peripheral wall of the movable tube section adjacent to the stop block is provided with a material guide hole, and the material guide hole communicates between the inside and outside of the movable tube section; and the pressing of the plastic pressing head is used to control the material guide hole to move out of the space shielded by the positioning tube.

4. The all plastic lotion pump according to claim 2, wherein the plastic reset spring is tubular.

5. The all plastic lotion pump according to claim 2, wherein the inner wall of the plastic cylinder casing is provided with a circle of bearing steps, and the plastic reset spring is compressed on the first plastic piston and the bearing steps.

6. The all plastic lotion pump according to claim 1, wherein the casing wall of the plastic cylinder casing is provided with an air return hole, the air return hole communicates between the inside and outside of the plastic cylinder casing, and the air return hole is arranged on the side of the plastic cylinder casing adjacent to the material delivery tube; and the plastic double piston mechanism at the initial position covers the air return hole.

7. The all plastic lotion pump according to claim 1, wherein the plastic cylinder casing is provided a one-way valve inside, and the one-way valve comprises a rubber ring, an elastic rubber film and a soft rubber connecting rib;

the rubber ring is provided with the elastic rubber film inside;

the elastic rubber film shields the position of the connection and communication part of the material guide hose and the plastic cylinder casing, wherein, the elastic rubber film remains sealed over the connection under normal conditions, and flexes upon pressing to allow one-way material flow into the plastic cylinder casing; and a plurality of the soft rubber connecting ribs are connected between the inner peripheral wall of the rubber ring and the outer peripheral edge of the elastic rubber film.

8. The all plastic lotion pump according to claim 1, wherein the plastic cylinder casing is sleeved with a gasket.

9. A single material storage bottle, wherein the storage bottle is equipped with the all plastic lotion pump according to claim 1, and the material guide hose is placed in the storage bottle.

* * * * *